United States Patent [19]

Chareire et al.

[11] Patent Number: 4,457,967
[45] Date of Patent: Jul. 3, 1984

[54] BRAKE DISC OF CARBON-CARBON COMPOSITE MATERIAL

[75] Inventors: Jean-Louis Chareire, Levallois-Perret; Guy Dupupet, Ermont, both of France

[73] Assignee: Le Carbone-Lorraine of Tour Manhattan, Courbevoie, France

[21] Appl. No.: 391,977

[22] Filed: Jun. 24, 1982

[30] Foreign Application Priority Data

Jul. 1, 1981 [FR] France .................. 81 12929

[51] Int. Cl.$^3$ .................. B32B 9/00; F16B 69/00
[52] U.S. Cl. .................. 428/212; 428/367; 428/374; 428/408; 264/60; 188/251 A
[58] Field of Search .................. 188/251 A; 428/408, 428/220, 367, 374, 212, 303

[56] References Cited

U.S. PATENT DOCUMENTS 3,639,197  2/1972  Spain .................. 188/251 X
3,991,248 11/1976  Bauer .................. 428/408 X Primary Examiner—P. Ives

[57] ABSTRACT

A brake disc of carbon-carbon composite material comprising a substrate of a mixture of carbon fibres of two very different ranges of length and embedded in a carbon matrix. The longer fibres are oriented and distributed randomly in planes approximately parallel to the friction surfaces of the disc, and the shorter fibres are oriented and distributed randomly in the volume of the disc. The brake discs according to the invention are useful in particular in the aviation field. They can be made by ultrasonically molding a mixture of the fibres and a suitable liquid, followed by heat treatment; or by chemical deposition of carbon from the vapor phase.

5 Claims, 2 Drawing Figures

BRAKE DISC OF CARBON-CARBON COMPOSITE MATERIAL

BACKGROUND OF THE INVENTION

The present invention relates to brake discs and in particular aircraft brake discs of carbon-carbon composite material comprising a substrate of carbon or graphite fibres embedded in a carbon matrix, and methods of manufacture thereof.

It is known that carbon-carbon composite materials are generally produced by preparing a substrate of carbon or graphite fibres, which is then subjected to a carbon densification treatment.

It is also known that the substrate may be made either using long fibres which are organized in different ways (two-dimensional or three-dimensional weaving processes, a needling operation, etc), or with relatively short fibres which are oriented in a partially or totally random fashion.

The present invention is only concerned with composite materials which are formed from short fibres, that is to say for example fibres which are from 0.01 to 6 cm in length.

In order to produce a component in the form of a brake disc, it is known that the short fibres may be arranged ether in a random manner with respect to the volume or the friction surfaces of the disc, or in an axisymmetrical manner with respect to the axis of the disc.

The present invention is not concerned with brake discs comprising axisymmetrical fibres.

Moreover, it is known that there are three important qualities regarding a brake disc;
good resistance to the braking torque,
good resistance to friction, and
low coefficient of expansion in regard to thickness.

The known brake discs comprising non-needled, non-axisymmetrical short fibres essentially have the first quality (in that the fibres are preferentially disposed in planes which are almost parallel to the friction planes and are randomly oriented in such planes. The length of the fibres used in that case is generally greater than the thickness of the disc).

SUMMARY OF THE INVENTION

The main aim of the present invention is to provide brake discs of carbon-carbon composite material, which provide all three of the above-mentioned qualities at the same time.

This aim is attained in accordance with the invention which comprises a brake disc of carbon-carbon composite material, comprising a substrate of short carbon or graphite fibres embedded in a carbon matrix, characterised in that the substrate is formed by a mixture of fibres of two very different length ranges, the longer being oriented and distributed randomly in planes approximately parallel to the friction faces of the disc, the shorter being oriented and distributed randomly in the volume of the disc.

DETAILED DESCRIPTION OF THE INVENTION

Figure 1:
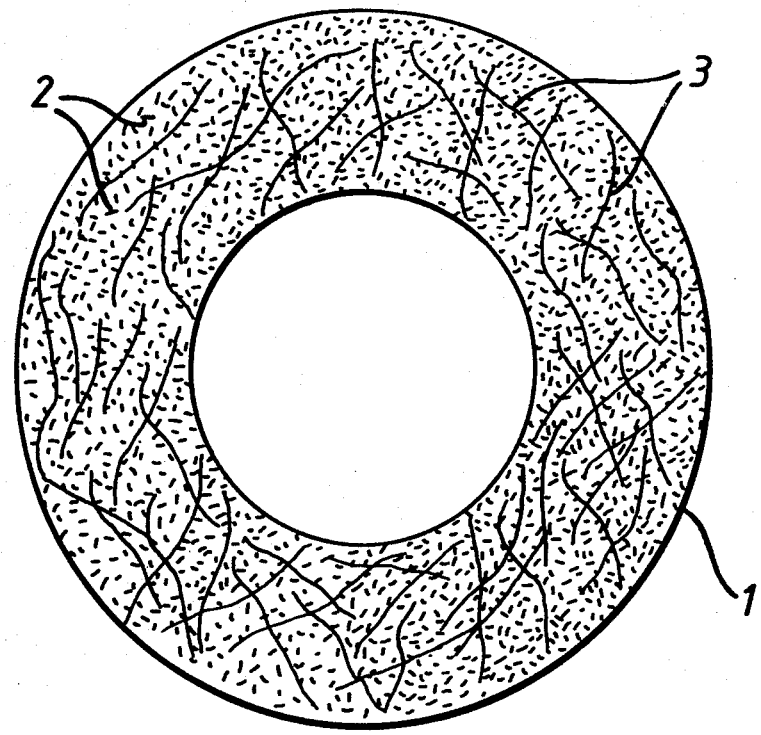
Figure 2:
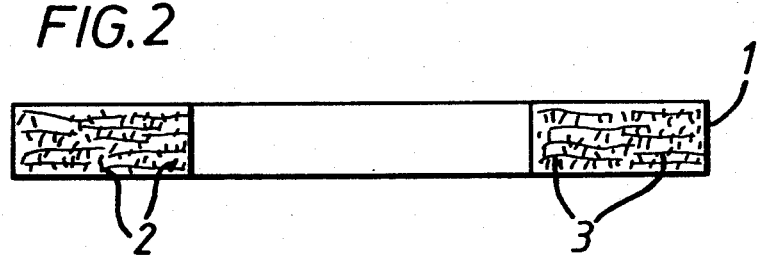

FIGS. 1 and 2 illustrate the arrangement of the fibres in a disc according to the invention.

FIG. 1 is a view of the face of the disc 1 comprising very short fibres 2 and longer fibres 3.

FIG. 2 shows the disc in cross-section.

In comparsion with the known discs, the discs according to the invention have the following advantages, by virtue of the presence and the arrangement of the very short fibres:
an improvement in the friction resistance, and
a reduction in the coefficient of expansion in respect of thickness.

The longer fibres provide a sufficient level of resistance to the braking torque.

The length of the longer fibres is advantageously from 4 to 6 cm while the length of the shorter fibres is from 0.015 to 0.3 cm.

The carbon or graphite fibres used may be produced from different precursors such as pitch or tar and polacrylonitrile. Graphite fibres produced from pitch or tar have the advantage of being formed by a quality of graphite which is highly suitable for frictional operation, which is inexpensive and which is a very good conductor of heat.

The discs according to the invention may be from 150 mm to 500 mm in outside diameter and may be from 10 to 25 mm in thickness, and may be produced by employing methods of manufacture which are also part of the present invention.

A first method of manufacture comprises:
putting into a mold which is approximately of the shape and the dimensions of the disc to be produced and which contains a liquid, an intimate mixture of short fibres of two very different ranges of length, of carbon or graphite,
subjecting the mold to ultrasonic vibration,
removing the liquid, and finally
effecting carbon densification of the substrate followed by a last heat treatment at a temperature which is less than or equal to 1800° C.

The fibres may originate for example from a pitch or tar or polyacrylonitrile precursor.

The intimate mixture may be produced:
either by mixing a liquid solution (water and wetting agent for example) into which the desired quantities of fibres in the two ranges of length are introduced,
or in a fluidized bed, in which case the fibres are set in motion by air mixing within a large-size container.

The intimate mixture of fibres which is produced using one of the above-indicated methods for example is placed in a mold which is disposed in a flat condition and which contains a sufficient amount of liquid that, after the fibres have been introduced (the fibres being dry or previously wetted, depending on the method of mixing), the liquid rises to the top of the mould.

The mold is then subjected to ultrasonic vibration which permits the longer fibres and the shorter fibres respectively to assume the orientation which is required in respect of each range of length, as described hereinbefore.

Depending on the final density of the fibrous substrate which is to be produced, the liquid-phase ultrasonic vibration operation may be performed in parallel with the application of a mechanical pressure to the fibres, such pressure being applied perpendicularly to the bottom of the mold for example by means of a metal plate which has small holes therein, to allow the liquid to pass therethrough.

After the ultrasonic vibration operation, which is optionally accompanied by a compression effect, the liquid is removed from the substrate (for example by heating if the liquid is water), and the carbon densification operation is then performed.

For that purpose, the following operations may be carried out:

either chemical deposit of carbon in the vapor phase, in the course of which a gas containing a hydrocarbon (for example methane) circulates within the substrate which has been previously raised to a temperature of approximately 1000° C. The hydrocarbon experiences cracking on contact with the fibres, thereby providing for the formation of sheaths of pyrocarbon around the fibres;

or impregnation of the substrate with liquid hydrocarbons (pitch or tar) or a resin, and carbonization in a neutral atmosphere, which two operations may optionally be repeated several times; the carbon matrix produced is then a coke;

or a combination of the two methods described above.

The process which is preferably employed is the chemical deposit of carbon from the vapor phase which, towards the end of the densification step, includes effecting a liquid-process impregnation operation followed by carbonization, and then followed by a fresh chemical deposit of carbon from the vapor phase.

The final heat treatment of the disc is preferably limited to 1600° C. (or 1800° C. at maximum) in order to retain the maximum degree of hardness in the matrix.

Another method of manufacture is a variant of that described above.

The various operations are virtually the same, except for the treatment with ultrasonic vibration in the liquid phase, for setting the fibres in place. That operation is replaced by a suction process; the suction surface is one of the flat walls of the mold, that is to say, one of the friction surfaces of the disc to be produced. It will be appreciated that, in that case, the mold has a wall which is sufficiently well sealed to retain the fibres while being sufficiently permeable to allow the suction air to pass therethrough

We claim:

1. A brake disc of carbon-carbon composite material and having friction faces, comprising a substrate of a mixture of short carbon fibres of two very different length ranges embedded in a carbon matrix, in which the longer fibres are oriented and distributed randomly in planes approximately parallel to the friction faces of the disc and the shorter fibres are oriented and distributed randomly in the volume of the disc.

2. A brake disc according to claim 1, in which the carbon fibres are of graphite.

3. A brake disc according to claim 1, in which the length of the longer fibres is in the range 4 to 6 cm and the length of the shorter fibres is in the range 0.015 to 0.3 cm.

4. A brake disc according to claim 1, in which the carbon fibres are produced from a pitch or tar precursor.

5. A brake disc according to claim 1, in which the carbon fibres are produced from a polyacrylonitrile precursor.

* * * * *

UNITED STATES PATENT AND TRADEMARK OFFICE
CERTIFICATE OF CORRECTION

PATENT NO. : 4,457,967
DATED : July 3, 1984
INVENTOR(S) : JEAN-LOUIS CHAREIRE AND GUY DUPUPET It is certified that error appears in the above-identified patent and that said Letters Patent are hereby corrected as shown below: On the title page;

[73] Assignee: Change Le Carbone-Lorraine of Tour Manhattan, Courbevoie, France
to read --Le Carbone-Lorraine of Courbevoie, France--.

Signed and Sealed this

Twenty-seventh Day of August 1985

[SEAL]

Attest:

DONALD J. QUIGG

Attesting Officer    Acting Commissioner of Patents and Trademarks